J. GEISSLER.
FRICTION GEARING.
APPLICATION FILED NOV. 14, 1910.

1,036,606.

Patented Aug. 27, 1912.

Witnesses:

Inventor:
Johannes Geissler

UNITED STATES PATENT OFFICE.

JOHANNES GEISSLER, OF DRESDEN, GERMANY.

FRICTION-GEARING.

1,036,606.

Specification of Letters Patent.

Patented Aug. 27, 1912.

Application filed November 14, 1910. Serial No. 592,316.

*To all whom it may concern:*

Be it known that I, JOHANNES GEISSLER, subject of the German Emperor, residing at 58 Fürstenstrasse, Dresden, Germany, have invented certain new and useful Improvements in Friction-Gearing, of which the following is a specification.

This invention relates to frictional power transmission, and especially to frictional gearing, and has for its several objects:— first, to provide automatic means for regulating the pressure of the frictional contact surfaces of a driver wheel and a driven wheel; second, to equalize the pressure on the opposite sides of said wheels and thereby eliminating the probability of the shafts (which carry said wheels) becoming bent; third, to provide a secondary driver wheel axially alined with the primary driver wheel, and adapted to rotate in a direction counter to the primary driver wheel; and fourth, to provide a friction gearing, combining with the foregoing advantages, those of simplicity of construction, economy in point of manufacture and maintenance, and thorough efficiency.

I attain the foregoing objects by the mechanism illustrated in the accompanying drawings in which similar letters designate similar parts, and in which:—

Figure 1:
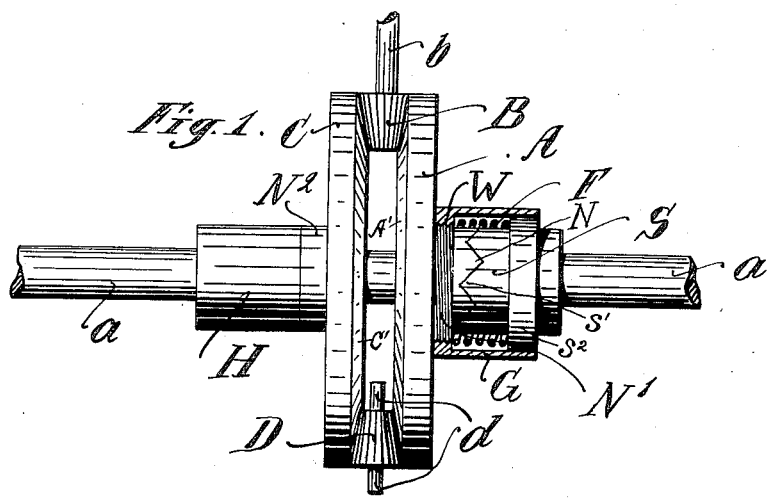
Figure 2:
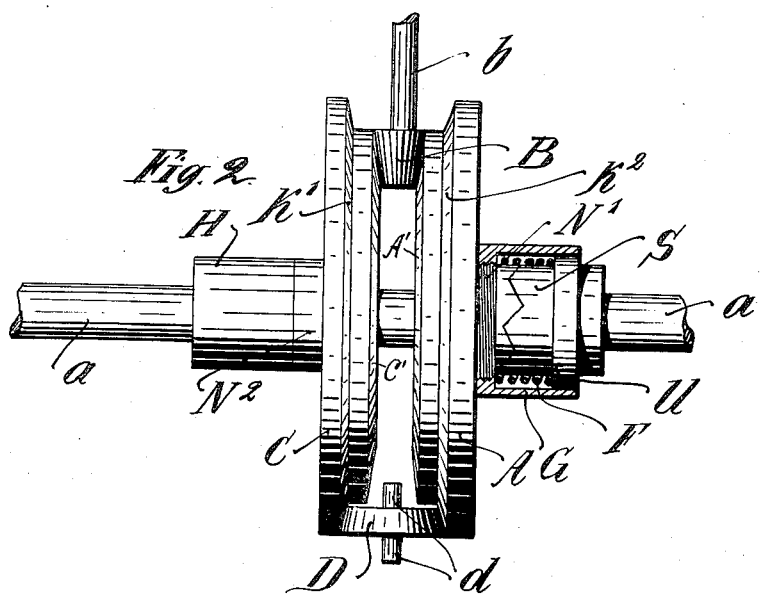

Figure 1 is a view in elevation, of a transmission gearing embodying my invention, certain parts being shown in section, and Fig. 2 is a similar view embodying a modification of the device.

In the drawings $a$ designates a shaft, which carries a primary driver wheel A, and a secondary driver or counter-motion wheel C; both of which are loosely mounted on said shaft. The wheel A has a toothed boss N′ integral therewith; each tooth N having cam surfaces joining with the cam surfaces of each contiguous tooth. Secured to the shaft $a$ is a toothed collar S, the teeth of which comprise cam surfaces similar to those described on the boss N′ and intermeshing with the same. A collar H is secured to the shaft $a$, and constitutes an abutment and thrust bearing for the hub N² of the wheel C. The wheels A and C have opposing conical surfaces A′ and C′; and rotatably mounted conical friction rollers B and D are arranged in frictional contact with the said conical surfaces; the axes of said rollers being on oppositely extended radii of the shaft.

The collar S has an enlargement S² thereon; and between this enlargement and the boss N′ is a compression spring F, which serves to normally force the wheel A against the rollers B and D. An annular guard or housing G is secured to the boss N′, preferably by means of a screw thread W, and extends over the cam teeth, encompassing the enlarged portion S² of the hub, for the purpose of excluding grit and dirt from said surfaces.

In considering the operation, let us consider the wheel A as if rotating; the visible surface thereof moving upward:—It is evident that its frictional contact with the roller B rotates the latter rightwardly and that the wheel C rotates in the counter direction thereto. It is also evident that the pressure of the spring F is approximately equally exerted upon the rollers B and D; and that the friction consequent to this pressure, causes the said rollers to rotate, if there is but little resistance opposing their rotation. Now suppose this resistance to be increased, by subjecting a greater load to the shaft $b$, (to which the roller B is secured); then the speed of the wheel A and toothed boss N′ are thereby instantly diminished; while the shaft rotates slightly forward, relative to said wheel and causes a relative movement of the cam teeth N and S′. This relative movement of the cam surfaces obviously increases the pressure of the wheel A against the rollers B and D, and thereby increases the friction of the conical surfaces, and increases the carrying capacity of said shaft $b$. The roller D is an idler, the function of which is to retain the wheels A and C in parallel relation and thereby prevent the shaft from becoming bent between said wheels A and C.

It is evident that various modifications, of this device may be employed without departure from the spirit of the invention and one such modification is illustrated in Fig. 2, which is dissimilar in construction to Fig. 1 only in the inclusion of the outer and opposite conical friction surfaces $k'$ and $k^2$, and in the greater diameter of the idler D. By this latter construction, the speed, pressure and consequent wear of the roller D are decreased, while the pressure and friction on the roller B is increased because of the greater distance of the roller D from the shaft than that of the roller B, and because of the consequent tendency of the shaft $a$ to bend and allow the roller B to be embraced with greater force between the conical surface A' and C'.

I claim:

1. Friction gearing comprising a shaft, a driver wheel rotatable on the shaft and having a conical friction surface thereon, a toothed boss on said wheel, a collar secured on the shaft and having cam teeth thereon, said cam teeth meshing with the teeth of said boss and adapted to move the driver wheel longitudinally of the shaft, a counter-motion wheel axially alined with said driver wheel and having a conical surface thereon, a friction roller axially alined with an extended radial line of said shaft and having its convex surface in contact with said conical surfaces of the driver wheel and counter-motion wheel, and means for preventing movement of the counter-motion wheel in the axial direction of the shaft.

2. Friction gearing comprising a shaft, a driver wheel having a conical friction surface thereon, a toothed boss on said wheel, a collar secured on the shaft and having cam teeth thereon, said cam teeth meshing with the teeth of said boss and adapted to move the driver wheel longitudinally of the shaft, a counter-motion wheel axially alined with said driver wheel and having a conical surface thereon, a conical friction roller axially alined with a radiant of said shaft and having its convex surfaces in contact with said conical surfaces of the driver wheel and counter-motion wheel, a collar on said shaft for preventing motion of the cam wheel in the axial direction of the shaft, and a driven shaft fixed to said roller for transmitting motion from the roller.

3. Friction gearing comprising a shaft, a driver wheel rotatable on the shaft and having conical friction surfaces thereon, a cam on said wheel, a collar secured on the shaft and having a cam thereon, said cams co-acting with each other for moving the driver wheel longitudinally of the shaft, a counter motion wheel rotatably seated on said shaft and having a conical surface thereon, a conical friction roller having its convex surface in contact with said conical surface of the driver wheel, and means for preventing movement of the counter-motion wheel in the axial direction of the shaft.

4. Friction gearing comprising a shaft, a driver wheel rotatable on the shaft and having concentric and offset friction surfaces thereon, a toothed boss on said wheel, a collar secured on the shaft and having cam teeth thereon, said cam teeth meshing with the teeth of said boss and adapted to move the driver wheel longitudinally of the shaft, a counter-motion wheel axially alined with said driver wheel and having concentric and offset friction surfaces thereon, a friction roller axially alined with a radiant of said shaft and having its convex surface in contact with the inner friction surfaces of said driver wheel and counter-motion wheel, an idler axially alined with a radiant of said shaft and contacting the outer friction surfaces of said driver wheel and counter-motion wheel, and means for preventing the counter-motion wheel from moving longitudinally of the shaft.

In testimony whereof, I affix my signature in the presence of two witnesses.

JOHANNES GEISSLER.

Witnesses:
 HENRY HASPER,
 WOLDEMAR HAUPT.